109-36.

05-15-73 OR 3,732,830

SR

United States Patent [19]

Lindstedt, Jr.

[11] 3,732,830

[45] May 15, 1973

[54] SECURITY METHOD AND DEVICE

[75] Inventor: Charles I. Lindstedt, Jr., Morris, N.J.

[73] Assignee: The United States of America as represented by the Secretary of the Army

[22] Filed: Nov. 26, 1971

[21] Appl. No.: 202,341

[52] U.S. Cl.........................................109/36, 109/24

[51] Int. Cl...................................................E05g 3/00

[58] Field of Search.......................109/36, 37, 23, 25, 109/29, 33, 1; 102/24 HC, 22, 90

[56] References Cited

UNITED STATES PATENTS

| | | | |
|---|---|---|---|
| 3,643,609 | 2/1972 | Maywald et al. | 109/29 |
| 2,898,085 | 8/1959 | Borins et al. | 102/24 HC |
| 2,809,585 | 10/1957 | Moses | 102/22 X |
| 3,592,148 | 7/1971 | Manis | 109/37 |
| 3,638,573 | 2/1972 | Campbell | 109/36 X |

FOREIGN PATENTS OR APPLICATIONS

| | | | |
|---|---|---|---|
| 456,601 | 7/1928 | Germany | 109/37 |
| 496,228 | 4/1930 | Germany | 109/37 |

*Primary Examiner*—Dennis L. Taylor
*Attorney*—Harry M. Saragovitz

[57] ABSTRACT

A method for insuring against an unauthorized access to confidential subject matter stowed in a container wherein said method comprises the steps of: juxtaposing sheets of multiple miniature shaped charges proximate to the confidential subject matter; sensing an unauthorized entry into said container; and detonating said shaped charges upon detection of such an unauthorized entry, whereby the confidential subject matter is destroyed by said detonation.

5 Claims, 4 Drawing Figures

SECURITY METHOD AND DEVICE

The invention described herein may be manufactured, used, sold and licensed by or for the Government of the United States for governmental purposes without the payment to me of any royalty thereon.

BACKGROUND OF THE INVENTION

A long existant problem in the security field has been that of insuring against unauthorized access to confidential subject matter. This problem has manifested itself in a variety of forms. One recent manifestation of the problem was the well-publicized Pueblo incident in which a U. S. Naval Intelligence ship was captured by hostile forces with a resultant loss of classified documents and equipment. Another aspect of the problem is that encountered by military and diplomatic couriers who constantly confront the possibility of theft of confidential documents. In addition, similar problems exist in private industry where industrial espionage is known to be widespread.

All of the above classes of security problems could be satisfactorily dealt with if a means of rapidly destroying confidential matter before its falling into enemy hands could be developed. The prior art has long grappled with this problem but without notable success.

The present invention represents the latest effort to deal with this problem of document and equipment security.

SUMMARY OF THE INVENTION

An object of the present invention is to provide a method for insuring against an unauthorized access to confidential subject matter.

Another object is to provide a device that embodies said method.

The present invention, by which the above objects are obtained, comprises:

juxtaposing sheets of multiple miniature shaped charges proximate to the confidential subject matter; sensing an unauthorized entry into a container holding said subject matter; and detonating said shaped charges upon detection of such an unauthorized entry, whereby the confidential subject matter is destroyed by said detonation.

DETAILED DESCRIPTION OF THE INVENTION

Figure 1:
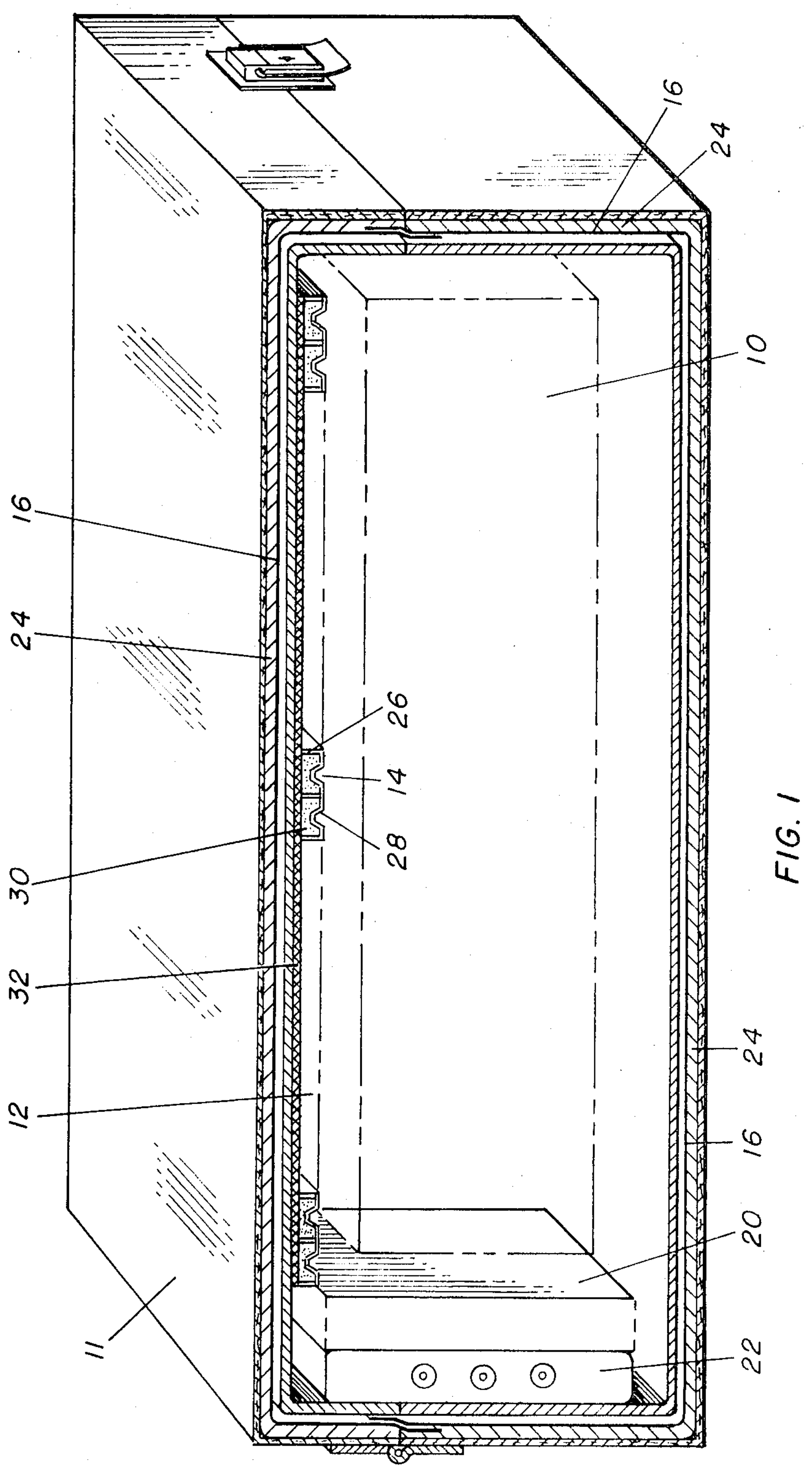
FIG. 1 is a cross-sectional side view of an armored attache case whose design embodies the present novel method and device.

The present invention may be readily grasped through reference to the embodiment illustrated in FIG. 1. Confidential subject matter storage area 10 is suitable for the storage of paper documents. Such paper documents would be the anticipated type of confidential subject matter for an attache case 11 of the type illustrated.

Figure 2:
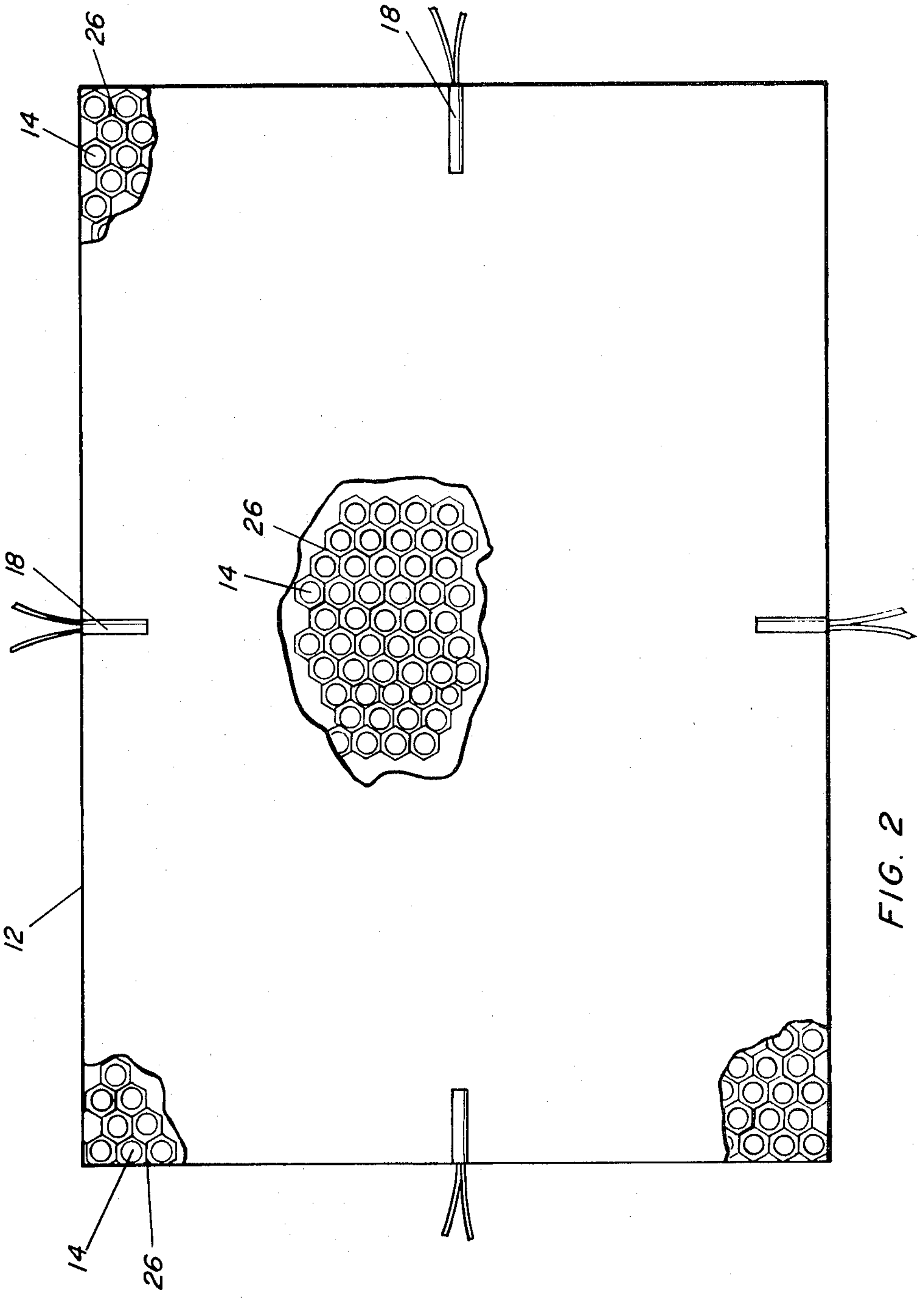
FIG. 2 is a plan, partial break-away view of a sheet of multiple miniature-shaped charges.

Directed at the storage area 10 is a sheet 12 of multiple miniature-shaped charges 14. A sensing means such as an electrically conductive membrane 16 detects any attempted unauthorized entry, whether physical, chemical or electromagnetic in nature. A detonating means 18 (see FIG. 2) is interconnected, by use of suitable penalty electronics 20, between the sensing means 16 and the shaped charges 14. A power supply 22 is utilized to power the sensing means 16 while the penalty electronics 20 transmits a signal to the detonating means 18. Hence, the confidential subject matter will be destroyed by the simultaneous unidirectional explosion of the shaped charges.

FIG. 1 also illustrates a layer of armor 24 that serves to encapsulate the entire system and give it sufficient strength to assure retention of any explosion within the armor without danger to persons in close proximity to it.

Authorized entry to the case is effected by use of a coded combination, either mechanical, electrical or both. In addition, intentional destruction of the confidential subject matter may be effected by direct actuation of the detonator.

Figure 4:
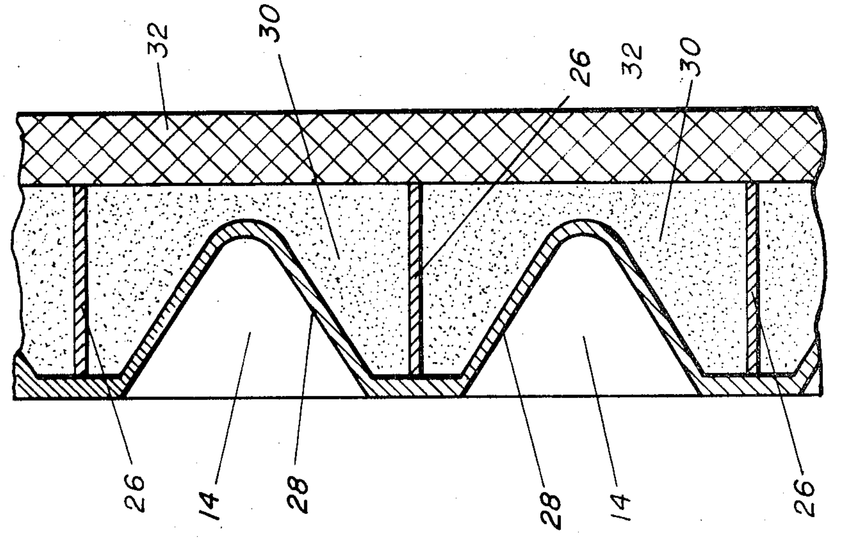
FIG. 4 is a cross-sectional view of FIG. 3 taken along line 4—4.
Figure 3:
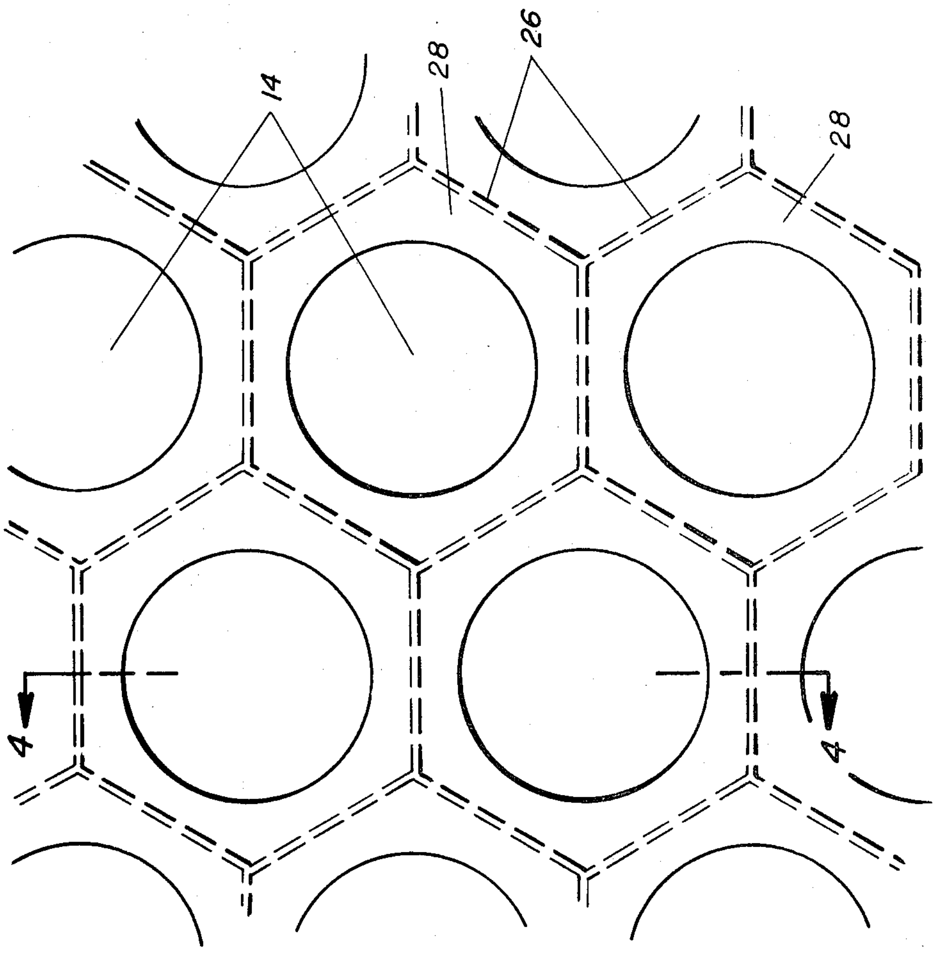
FIG. 3 is an enlarged bottom view of the shaped charges in honeycombed compartments.

The sheet 12 of multiple miniature shaped charges 14 comprises (1) a multiplicity of honeycomb-like compartments 26 (see FIGS. 2 and 3), (2) a shaped charge liner 28 (see FIGS. 1 and 4) set within the compartments 26 wherein the liner 28 defines the shaped charge surface 14 that is directed at the confidential subject matter storage area 10, (3) a multiplicity of shaped explosive charges 30 (see FIGS. 1 and 4) that are set above the liner 28 and between the compartments 26, and (4) a layer 32 of booster explosive (see FIGS. 1 and 4) which is disposed above and contiguous to the shaped charges 30.

The entire device may be coated with an environmental seal in order to protect it from undesirable events due to conditions of climate and transportation.

Other forms of security containers are readily adaptable to the present novel concept. For example, a security safe could be assembled utilizing a plurality of sheets, such as sheet 12, within the drawers of a safe. Also, such sheets could easily be made to chassis size and placed in classified electronic and mechanical assemblies.

The present inventive concept may be successfully embodied in numerous configurations constructed of a variety of materials. For example, the shaped charges 14 may, in addition to the illustrated conical shape, be shaped as hemispheres, cylinders, trumpets, and combinations thereof. Multiple cone configurations may be die drawn, cast, sprayed or rolled onto the shaped charge liner 28. Different configurations of charges on the same sheet may be necessary to defeat non-homogeneous targets. Various materials are suitable for the liner 28. These materials include glass, fiberglass, graphite, plastic and metal. Suitable metals include aluminum, copper, steel, lead, zinc, magnesium, and alloys and mixtures thereof. Liner thickness may vary with cone angle, cone configuration, charge confinement, charge composition and liner material. The sheet sizes 12 are flexible, with target size determining sheet area.

Sheets of honeycomb-like compartments 26 are commercially available (e.g., Hexcel) in hex shaped cells of various materials such as aluminum, fiberglass, plastics, stainless steel and other metallic foils. The cells of the honeycomb should be concentrically located about the cones 14 and may be chemically or mechanically bonded in place. Cell shape may include circular, square and polygonal configurations. Thickness will vary with charge size.

The explosive charge 30 is confined between the charge liner 28 which is below it, the honeycomb walls 26 around its sides, and the booster charge 32 above it. The composition, size, and configuration of the charge may be varied to attain the desired target penetration.

The use of the booster charge 32 serves as one possible method of igniting the explosive charge 30. A suitable booster that is commercially available is DETASHEET by Du Pont. This product is produced in a variety of different chemical compositions, thicknesses and sheet sizes. It would also be feasible to place individual boosters behind each explosive charge 32.

The detonating means 18 is readily obtainable in commercial form. One such suitable form is the MINIDET detonator sold by Du Pont. This detonator may be either electrically or mechanically actuated. They are available in either single or multiple units that are embedded into the sheet of booster charge 32.

It is thus seen from the above that the objects set forth in the Summary of the Invention are among those made apparent from and efficiently attained by the method and device of the preceding description.

I wish it to be understood that I do not desire to be limited to the exact detail of construction shown and described for obvious modification will occur to persons skilled in the art.

Having described my invention, what I claim as new, useful and non-obvious and accordingly secure by Letters Patent of the United States is:

1. A device for insuring against an unauthorized access to confidential subject matter stowed in a container, comprising:

a sheet of multiple miniature shaped charges placed proximate to and directed toward the confidential subject matter;

a sensing means for detecting attempted unauthorized entry into said container; and a detonating means interconnected between said shaped charges and said sensing means for detonating said charges upon activation of said sensing means, whereby the confidential subject matter is destroyed upon detonation of said shaped charges.

2. The device as recited in claim 1 wherein said sheet of multiple miniature shaped charges comprises:

a multiplicity of honeycomb-like compartments;

a shaped charge liner set within said compartments, said liner defining a shaped charge surface proximate to the confidential subject matter;

a multiplicity of shaped explosive charges, said charges set above said liner and within said compartments; and a layer of booster explosive, said layer disposed contiguous to said multiplicity of shaped explosive charges.

3. The device as recited in claim 2 wherein said sensing means comprises a penetration sensor disposed about the spacial periphery of the confidential subject matter for detecting attempted unauthorized entry by physical, chemical and electromagnetic means.

4. The device as recited in claim 3 wherein said device is encapsulated in a container having sufficient strength to assure retention of the explosion within the container without danger to persons in close proximity to said container.

5. The device as recited in claim 4 wherein said device is coated with an environmental seal in order to protect it from undesirable events due to conditions of climate and transportation.

* * * * *